June 18, 1968     A. M. ZAREM ET AL     3,389,259
OPTICAL INSTRUMENT ANTI-FLASH SHUTTER SYSTEM
Filed April 21, 1965     5 Sheets-Sheet 1
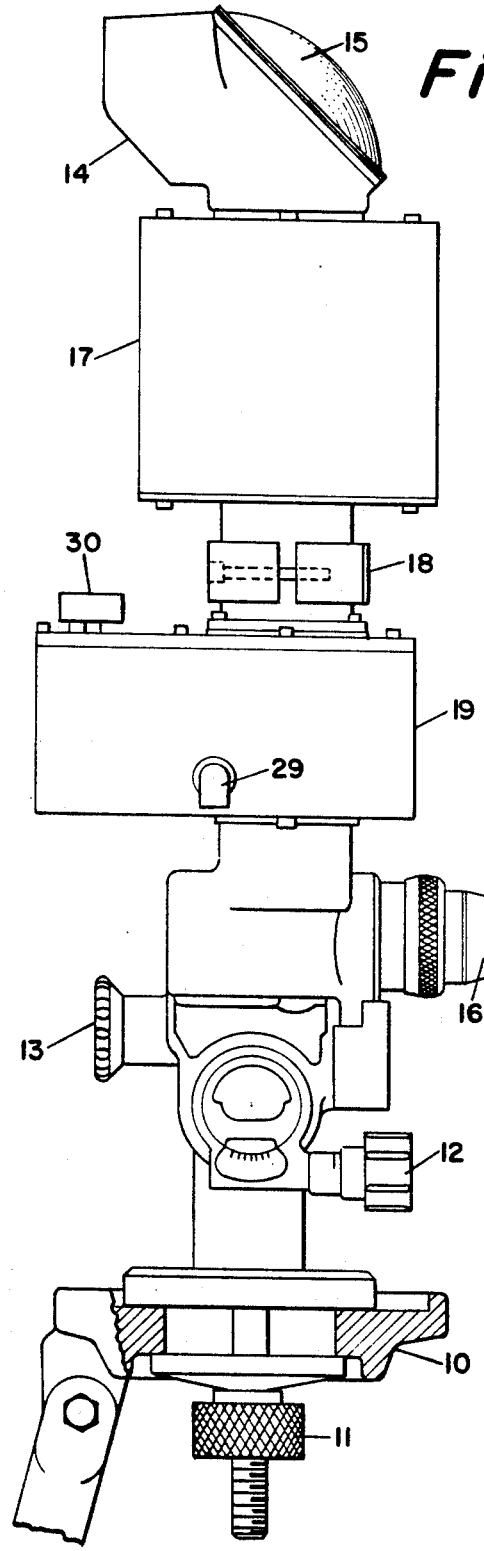
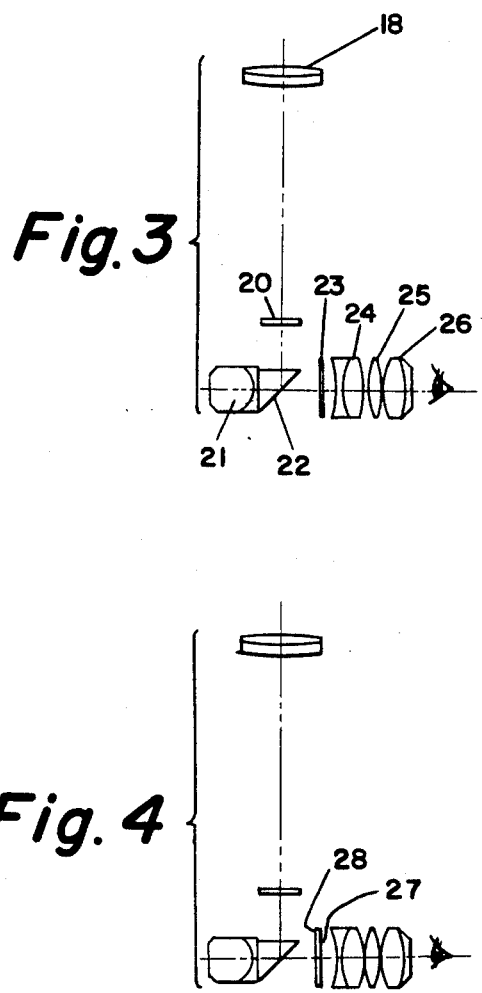
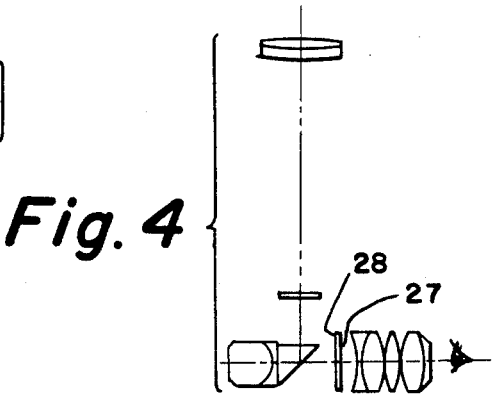
INVENTORS.
ABE MORDECAI ZAREM
STUART MELVIN HAUSER
BY Harry M. Saragovitz,
Edward J. Kelly, Herbert Berl
& S. Dubroff
ATTORNEYS

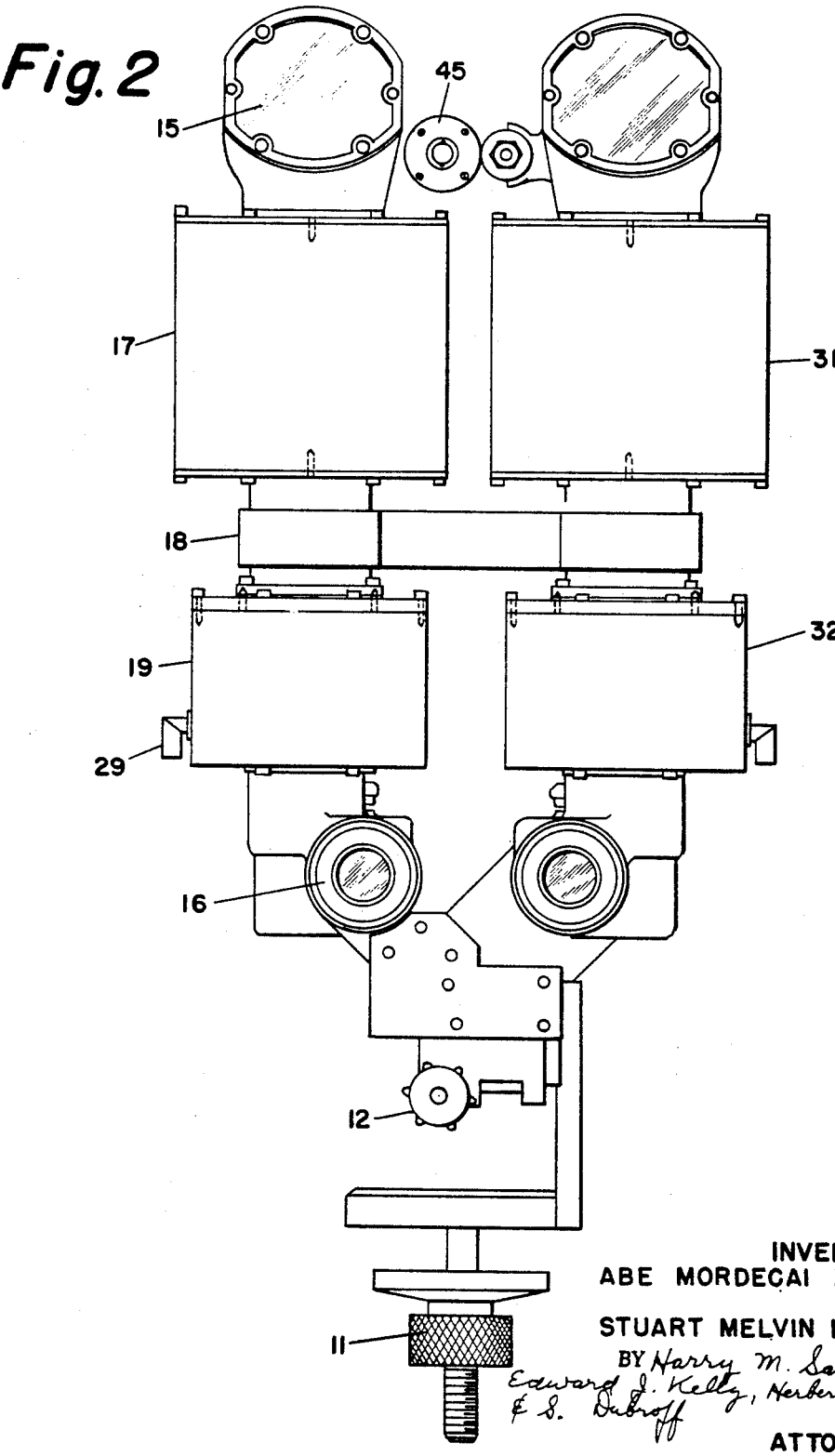

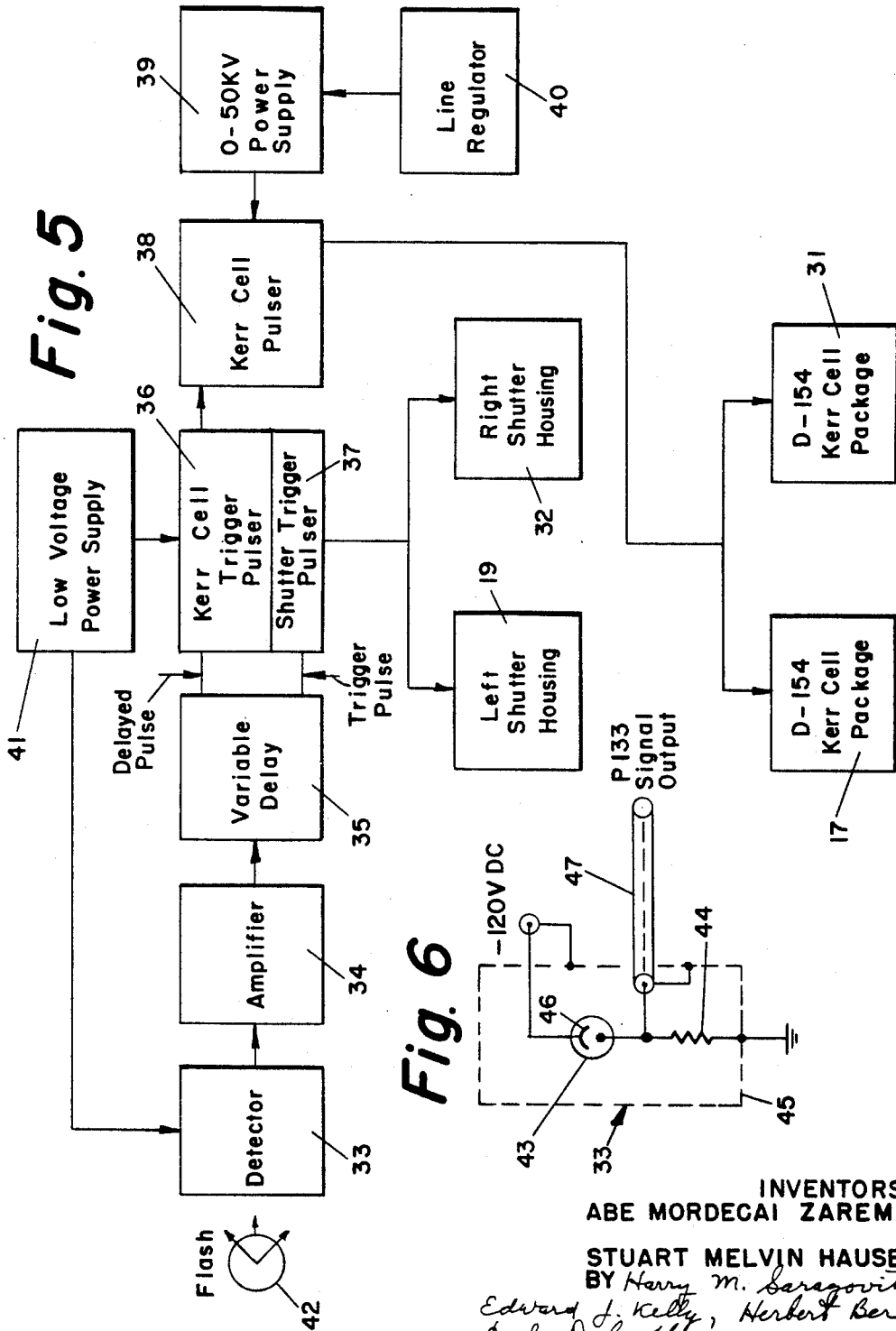

INVENTORS.
ABE MORDECAI ZAREM
STUART MELVIN HAUSER

ATTORNEYS

Voltage Across Resistor 73

Voltage Across Kerr Cells

United States Patent Office 3,389,259
Patented June 18, 1968

3,389,259
OPTICAL INSTRUMENT ANTI-FLASH
SHUTTER SYSTEM
Abe M. Zarem, San Marino, and Stuart M. Hauser, Monrovia, Calif., assignors, by mesne assignments, to the United States of America as represented by the Secretary of the Army
Filed Apr. 21, 1965, Ser. No. 449,907
2 Claims. (Cl. 250—201)

ABSTRACT OF THE DISCLOSURE

Anti-flash shutter system for optical instruments of the type having means for receiving and reflecting light into an optical path terminating in a viewing eyepiece. Included serially in the optical path is a Kerr cell or like electro optical shutter, an objective lens, a high-speed electrically-operated mechanical shutter and a lens system. An electrical control system for the shutters is provided in connection with an electro-optical flash detector responsive to a flash of light in the field of view and a pulse output signal amplifier therefor. A silicon controlled rectifier is gated by the amplified pulse to apply tripping current to close the mechanical shutter which may be cocked open. A thyratron pulse generator is fired by a delayed portion of the amplified detector pulse output to operate a thyratron-switching element for cutting off a high holding voltage from the electro-optical shutter, thereby permitting it to close just in advance of the above-acting mechanical shutter. Thus a double-acting protection from flash is provided.

---

This invention relates to optical instruments for use under conditions where there is a possibility of its exposure to visible energy rays generated by a nuclear explosion. It provides an optical instrument whereby such rays, as viewed through the instrument, are intercepted before injuring the eye of the observer.

A need exists for observation and weapon-laying fire control instruments fully capable of use during nuclear war. Conventional optical fire control instruments do not possess such capability since a nuclear burst within their fields of view could subject the observer to temporary flash blindness, as well as temporary or permanent retinal damage due to the extreme thermal radiation transmitted through the optical system to the observer's eyes.

In order to provide this protection, it is necessary that these optical instruments be provided with automatic, anti-flash shutter systems having adequate closure times and sufficient optical density when in a closed condition.

There is evidence indicating that closure times well below one millisecond may be required. Most conventional mechanical shutters with a suitably large aperture (i.e., one inch or larger) have closure times on the order of several milliseconds. Other higher speed mechanical shutters, such as the grid shutter, have characteristics which make them unsuited to high magnification optical instruments. By virtue of their inherently fast operating times (below one microsecond), electro-optical or magneto-optical shutters are appropriate for this purpose. Of these devices, the Kerr cell type of electrooptical shutter is found to be the most suitable.

The instrument of the present invention includes a high speed binocular anti-flash shutter system which intercepts the flash within one millisecond. This system includes two shutter elements disposed in the optical path of the instrument. The first of these elements is a Kerr cell which initiates the shuttering action at an early phase in the flash. This action is followed by the closure of a high speed capping or closure shutter which is readily commercially available.

The invention will be better understood from the following description when considered in connection with the accompanying drawings and its scope is indicated by the appended claims.

Referring to the drawings:

FIG. 1 shows a side view of the instrument of our invention;

FIG. 2 illustrates the instrument as viewed from the front;

FIGS. 3 and 4 show such parts of the right and left optical system as are not visible from the exterior of the instrument;

FIG. 5 is a block diagram indicating the relation between the shutters and their control circuits;

FIG. 6 is a wiring diagram of a detector circuit;

Figure 7:
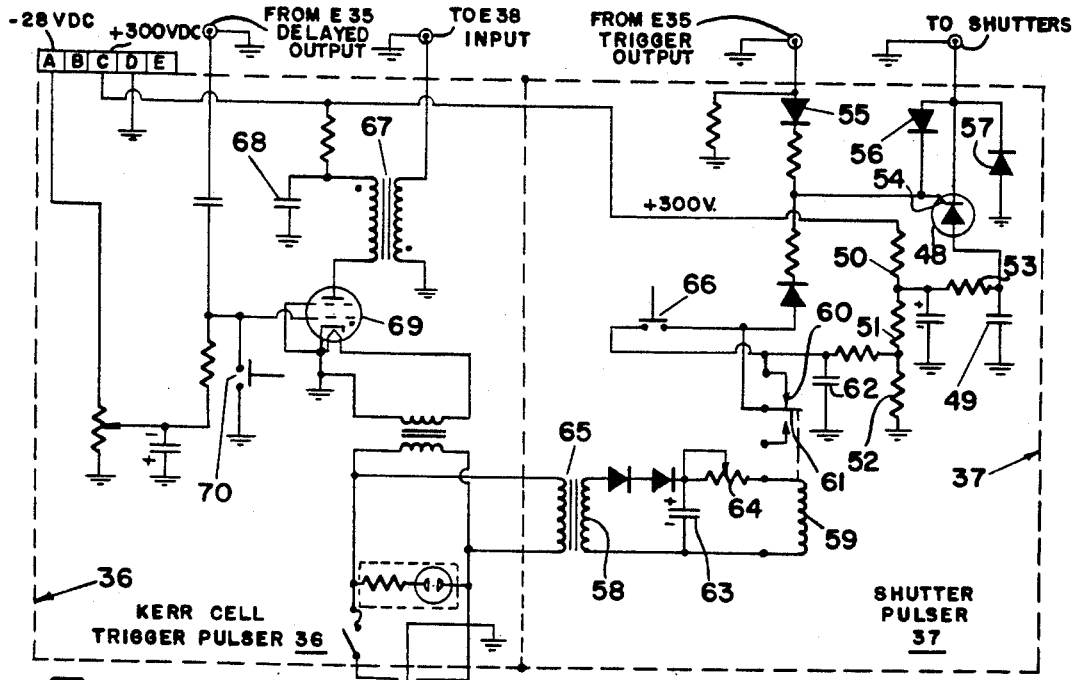
FIG. 7 is a wiring diagram of a low voltage pulse generator.

The instrument of FIGS. 1 and 2 includes a left hand unit and a right hand unit which are substantially identical. The left hand unit is illustrated by FIG. 1 and will be described in detail. The instrument is fixed to a base 10 by means of a nut 11. It is adjustable transversely by means of a knob 12 and vertically by means of a knob 13. Light entering through a window 14 is reflected from a head 15 through the optical system of the instrument to an eyepiece 16.

Included serially in this optical path are a Kerr cell 17, an objective lens 18 (FIGS. 1 and 3), a high speed mechanical shutter 19, and the optical elements appearing at the bottom of FIG. 3. These optical elements include a filter 20, porro prism 21, 90° prism 22, diaphragm 23, field lens 24, center lens 25 and an eye lens 26. The functions performed by these various elements are well understood by those skilled in the art without detailed explanation. The optical system of the right hand unit (FIG. 4) is similar to that of the left hand unit with the exception that the diaphragm 23 is replaced by a window 27 and a reticle 28. Associated with the high speed mechanical shutter 19 are a connector 29 and a cocking knob 30.

The control system for the mechanical shutters 19 and 32 and the electro-optical shutters 17 and 31 is shown in FIG. 2 and in box form by FIG. 5. This control system includes a detector 33, an amplifier 34, a variable delay unit 35, a Kerr cell trigger pulser 36, a mechanical shutter trigger pulser 37, a Kerr cell pulser 38, a 0–50 kv. power supply 39, a line regulator 40 and a low voltage power supply 41.

In the operation of this system, a light flash 42 in the observer's field of view is converted into an electrical signal by the detector 33. This detected signal is amplified by the amplifier 34 and transmitted to the variable delay unit or pulse delay and trigger generator 35. This pulse delay and trigger generator produces (1) a delayed pulse which is continuously variable from 1 to 10,000 microseconds and (2) one undelayed pulse for each input signal. The delayed pulse triggers the section 36 or Kerr cell trigger pulser of a low voltage pulse generator. The undelayed pulse triggers the section 37 or shutter trigger pulser of the low voltage pulse generator and functions through this generator to operate the mechanical shutters 19 and 32. The output from section 36 of the low voltage pulse generator is applied to the pulser 38 which controls the operation of the electro-optical shutters 17 and 31. This pulser is energized from the power supply 39 under the control of the line regulator 40. Thus the mechanical backup shutters 19 and 32 are driven directly from the shutter pulser 37 while the electro-optical shutters 17 and 31 are driven by the pulser 38.

The circuit of the detector 33 is illustrated by FIG. 6. It includes a vacuum photodiode 43 which may be of the type known commercially as IP 42, and a 15000-ohm resistor 44, both located in the detector head assembly 45. The IP 42 photodiode is preferred because of its spectral sensitivity and its intensitivity of ambient temperatures. Its maximum response is in the blue region making it most sensitive to temperatures on the order of 6000° K. and higher which have been measured for the very early phases of nuclear fireballs. The anode 46 is operated at about 120 v. DC from the power supply 41 (FIG. 5). The load circuit at fast rise times (frequencies above 100 kc.) consists of the resistor 44 shunted by the capacitance of the signal cable 47 which amounts to about 100 micro-micro farads. While some loss of response to light flashes of extremely brief duration are encountered, the equivalent load circuit represents a nearly constant impedance for light flashes having rise times longer than one microsecond.

The amplifier 34 consists of a pair of amplifiers having a frequency response with 3 db points at five and 1,000,000 c.p.s., and gains of 20 db (10×) and 40 db (100×) which can be selected by means of switches. One of these units was modified internally so that its low-frequency 3 db point occurs below 1000 c.p.s. Use of the two amplifier units allows the following versatility of operation:

(1) Gains of 20 db (10×) and 40 db (100×) can be obtained with either units singly, or total gains of 40 db (100×), 60 db (1000×) and 80 db (10000×) can be obtained by using both units in tandem.

(2) For detector signals exceeding 100-mv., either amplifier can be used alone with sufficient output signal magnitude to trigger the pulse delay and trigger generator 35.

(3) For use where the ambient light level has a substantial time varying component, the modified amplifier reduces the possibility of unintentional shutter closure as a result of its modified low frequency response.

The pulse delay and trigger generator or variable delay unit 35 (FIG. 5) functions (1) to deliver to the shutters trigger pulser 37 one undelayed trigger pulse for each input signal (2) to deliver to the Kerr cell trigger pulser 36 one delayed pulse which is continuously variable from one to 10000 microseconds.

The wiring diagrams of the Kerr cell trigger pulser 36 and the shutter trigger pulser 37 are shown in FIG. 7. The shutter pulser 37 performs two functions. It supplies energy to the shutter solenoids upon pulse command, and contains a safety circuit which closes the shutter upon failure of the line voltage or when the line voltage drops below a pre-set value.

The switching element is a controlled silicon rectifier 48, a solid state device which performs a circuit function similar to that of a gas filled thyraton. Energy is stored in a capacitor 49 which is isolated from a voltage divider 50–51–52 by means of a high resistance 53. The normally open forward anode to cathode impedance drops to a short circuit condition when energy is injected at the gate electrode 54, permitting capacitor 49 to discharge through the load in the cathode circuit, which in this case, is the shutter solenoids in parallel. The anode to cathode impedance remains low until the forward current falls below a small value, a few milliamperes, called the holding current. As the rectifier can be damaged by a slightly negative potential applied to the gate electrode with respect to the cathode, diodes 55 and 56 are provided to prevent the application of negative input signals to the gate electrode and also to tie this electrode to the cathode when the rectifier breaks down after triggering. Diode 57 is a shunt for negative inductive kicks which also have deleterious effects when applied to the cathode.

The fail-safe safety circuit consists of a half-wave rectified, poorly filtered power supply 58 in which the D.C. impedance of the coil 59 of a fast mercury relay is the load. The purpose of this circuit is to provide protection to both test subjects and measuring instruments should the primary line power fail during the course of laboratory or field tests which might involve the use of damaging radiation sources. When the line voltage drops below a pre-set value, the relay contacts 60–61 close, discharging the energy stored in the capacitor 62 into the gate circuit of the controlled rectifier 48 and closing the mechanical shutters 19 and 32 (FIG. 5). The delay time for this operation is about 12 milliseconds.

The drop-out line voltage is controlled by a capacitor 63, a resistor 64 and the voltage at the secondary winding of a transformer 65 which can be selected from any one of six secondary taps. A test switch 66 is provided to initiate shutter closure manually by discharging the capacitor 62 through the gate electrode of the rectifier.

The Kerr cell trigger pulser 36 is a conventional thyratron (2D21) pulse generator employing an inverter 1:1 pulse transformer 67 as a load. Energy is stored in a capacitor 68. When the thyratron 69 is triggered by the delayed pulse from the pulse delay and trigger generator 35, a positive pulse equal in magnitude to the thyratron plate voltage, appears across the secondary winding of pulse transformer 67. The open circuit pulse amplitude is 300 volts and its duration is 5 microseconds at the 50 percent amplitude points. A push button 70 permits manual operation of the Kerr cell trigger pulser.

The electro-optical shutters 17 and 31 (FIG. 5) consist of Kerr cells mounted between accurately crossed linear polarizers. These shutters are stressed open by the application of a D.C. voltage. Shutter closure is initiated by removal of this voltage. The wide aperture Kerr cell shutters utilized in the present anti-flash system requires 30 to 50 kilovolts, depending on temperature, to achieve the fully open condition. Since closure times are required to be as short as 10 microseconds and the fully closed condition to at least 10 milliseconds, severe practical considerations (such as total power dissipation and high voltage packaging) determine the design of the Kerr cell pulser 38 (FIGS. 5 and 8).

Figure 8:
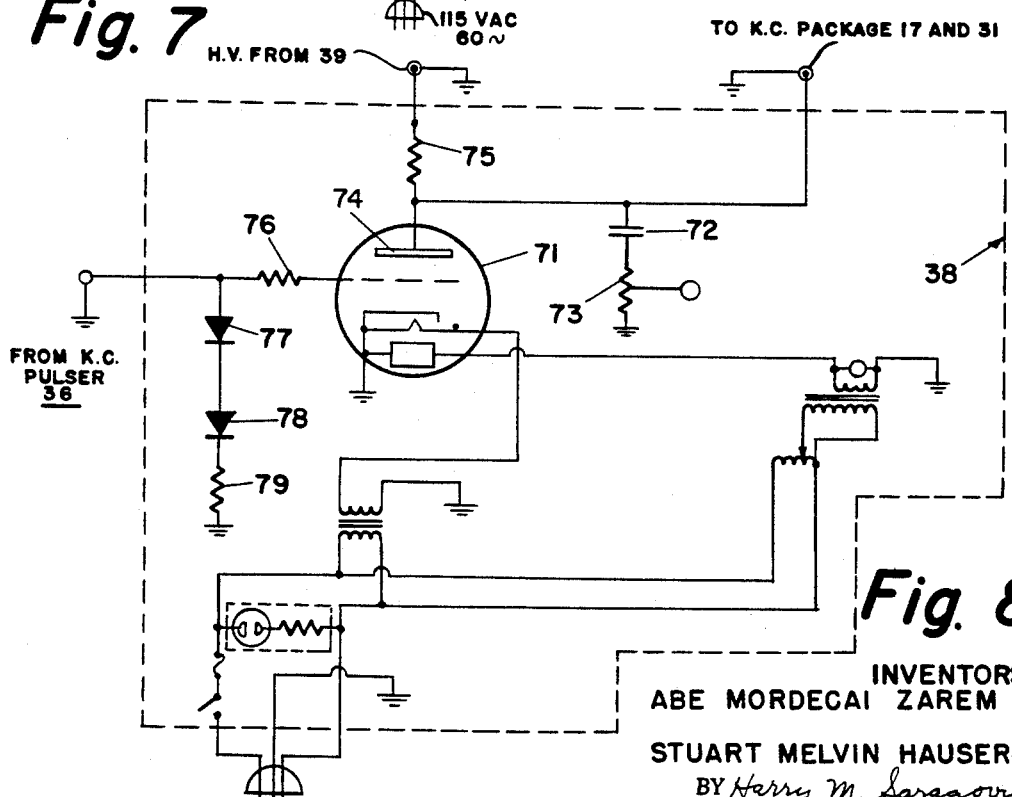
FIG. 8 is a wiring diagram of a Kerr cell pulser.
Figure 9:
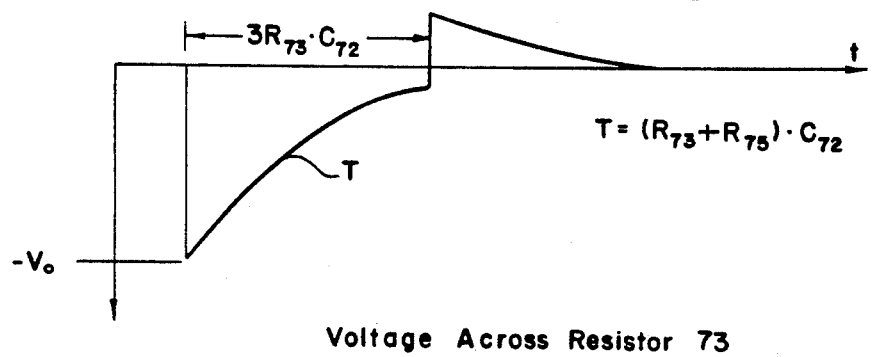
FIGS. 9 and 10 are voltage wave forms in a Kerr cell pulser circuit.
Figure 10:
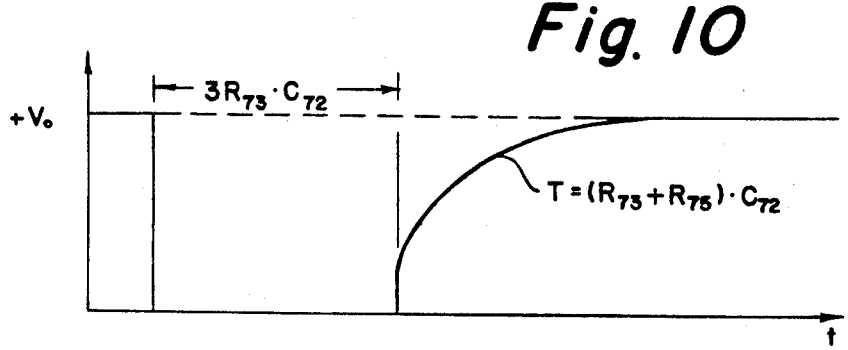

FIG. 8 shows the details of Kerr cell pulser 38. It consists of a Type 6587 high voltage thyratron switching tube 71 and the RC combination 72 and 73. The Kerr cells are connected in parallel between the thyratron anode 74 and ground. During the normal quiescent open condition, the anode voltage appearing across the Kerr cells biases or stresses them to the open state. When the tube is ionized by means of a positive pulse applied to the grid, the anode falls to ground potential. This removes the voltage from the Kerr cells and allows them to close. During the discharge period, the capacitor 72 discharges through the resistor 73 for a time approximately equal to $T = 3R_{73} \cdot C_{72}$, resulting in an exponential decaying waveform across resistor 73 (FIG. 9). The tube will remain ionized until the tube current falls below a holding current value, usually a few milliamperes, depending on the tube gas pressure. The wave form at the anode and also across the Kerr cells during the interval $T = 3R_{73} \cdot C_{72}$ is the negative triangular step shown in FIG. 10. The small step in voltage at the end of T corresponds to the tube cut-off, and the following exponential increase in voltage is determined by the charging time constant $(R_{75} + R_{73}) \cdot C_{72}$.

Since the Kerr cell bias voltage corresponding to the fully opened condition is a function of temperature, means for regulating the cell voltage or temperature are desirable. This requirement is achieved in the present equipment by external selection of the appropriate operating voltage at the high voltage power supply 39 (FIG. 5).

The grid circuit of the thyratron 71 (FIG. 8) is somewhat unusual. It is customary practice to drive the grid from a low impedance source (500 to 1000 ohms) to reduce breakdown delay and jitter. During the breakdown process, a voltage spike of brief duration (less than 0.1 microsecond) and equal in magnitude to a large portion of the anode voltage appears at the grid. Consequently, a high voltage, low impedance filter is normally used as a grid circuit load to prevent feedback of the grid spike to the driving circuit.

There is a difficulty with this technique in the present application. The size of such components required to withstand the anode spike is prohibitive. Consequently, since both breakdown delay and jitter are relatively unimportant in the present instance, the grid circuit consists of a relatively high impedance resistor 76 (10,000 ohms) in series with the driving circuit of the pulse delay and trigger generator 36. The breakdown delay is about 0.4 microsecond when driven by the trigger generator 36. Resistor 76 limits both the voltage and current appearing across the driver output circuit to safe values due to the grid spike.

As an additional precaution, the input of the thyratron 71 is shunted by diodes 77 and 78 in series with a resistor 79. These diodes are a newly developed four-layer solid state type which becomes conducting when the forward voltage exceeds a specified value. This input circuit will pass the low voltage driving pulse (300 volts) but will break down upon the application of higher pulse amplitudes. The main purpose of this shunt section is to safeguard against grid spikes due to spontaneous tube breakdown. Such grid spikes appear to be of longer duration and much larger in amplitude than the normal grid spike.

Kerr cell electro-optical shutters for the present application can be operated in either of two modes. In the present case, a pair of crossed linear polarizers are utilized as a shutter system. The shutter is normally closed and is opened by the application of a suitable voltage to the cell electrodes. Since the molecular relaxation time for nitrobenzene is of the order of $50 \times 10^{-12}$ seconds closure time is limited only by the speed at which the applied voltage can be removed.

Shutter assembly optical characteristics of primary interest are (1) maximum or open tranmission, (2) minimum or closed transmission, and (3) optical resolution. The transmission characteristics are determined primarily be the type of linear polarizers employed. Present polarizers of large aperture are usually of the dichroic type and are readily available commercially. Optical resolution is primarily a function of the optical quality of the air-glass surfaces of the shutter system. Since a high optical density in the closed condition is a requirement of the present system, Polaroid type HN-22 linear polarizers have been used because of the low extinction ratio (ratio of crossed to open transmission) attainable with this polarizer.

As previously indicated, the mechanical backup shutters 19 (FIGS. 1 and 2) are a commercial product and have a 1⅝ inch aperture and are spring driven upon actuation of a solenoid. Latching or cocking is manually performed by rotation of a cocking knob 30 (FIG. 1). While the shutter solenoids can be actuated by 28 volts applied through the switch 66 (FIG. 7) high speed closure is effected by increasing the driving voltage level to about 130 volts for pulsed operation. This energy is stored in the capacitor 49 (FIG. 7).

We claim:
1. In an anti-flash optical instrument, the combination of
an optical system including an objective lens,
a mechanical shutter fixed in said optical system at one side of said lens and electrically operable to close in response to an applied electrical trigger pulse,
an electro-optical shutter fixed in said optical system at the other side of said lens and operable to open in response to an applied voltage,
means for directing light from a field of view through said shutters and said optical system, and
control means operable in response to a flash in said field of view to close said electro-optical shutter and said mechanical shutter sequentially, said control means including
an electro-optical detector for converting said flash to an electrical signal pulse,
means connected with said detector for amplifying said signal pulse,
means connected with the amplifying means for deriving from the amplified signal pulse a direct trigger pulse and a delayed pulse,
means coupling said trigger pulse to said mechanical shutter to energize and close said mechanical shutter in response thereto, and
means coupling said delayed pulse to said electro-optical shutter to deenergize and close said electro-optical shutter preceding closure of said mechanical shutter.

2. In an anti-flash optical instrument the combination as defined in claim 1, wherein said electro-optical shutter is in advance of said lens and said mechanical shutter is to the rear of said lens along the optical path therethrough, and wherein said mechanical shutter closing means includes a solenoid having a controlled silicon rectifier coupled thereto and said electro-optical shutter closing means includes a high voltage pulser including a thyratron switching element having an anode and a control electrode, a high voltage supply source coupled to said anode and a low voltage thyratron switching element coupled to said control electrode.

References Cited

UNITED STATES PATENTS

| | | | |
|---|---|---|---|
| 3,116,660 | 1/1964 | Goss et al. | 95—53 |
| 3,273,458 | 9/1966 | Kohler | 350—150 |

JEWELL H. PEDERSEN, *Primary Examiner.*

RONALD L. WIBERT, *Examiner.*

B. W. DELOSREYES, *Assistant Examiner.*